United States Patent
Abinader, Jr. et al.

(10) Patent No.: US 9,432,854 B2
(45) Date of Patent: Aug. 30, 2016

(54) INTERFERENCE AVOIDANCE BETWEEN OVERLAPPING WIRELESS NETWORKS

(71) Applicant: Nokia Corporation, Espoo (FI)

(72) Inventors: Fuad Mousse Abinader, Jr., Manaus (BR); Sayantan Choudhury, Berkeley, CA (US); Fabiano de Sousa Chaves, Manaus (BR); Andre Mendes Cavalcante, Manaus (BR); Erika Portela Lopes de Almeida, Brasilia (BR); Robson Domingos Vieira, Brasilla (BR); Klaus Franz Doppler, Albany, CA (US)

(73) Assignee: Nokia Corporation, Espoo (FI)

( * ) Notice: Subject to any disclaimer, the term of this patent is extended or adjusted under 35 U.S.C. 154(b) by 120 days.

(21) Appl. No.: 14/026,245

(22) Filed: Sep. 13, 2013

(65) Prior Publication Data
US 2015/0078259 A1 Mar. 19, 2015

(51) Int. Cl.
*H04W 24/02* (2009.01)
*H04W 72/12* (2009.01)
*H04W 16/14* (2009.01)

(52) U.S. Cl.
CPC ............. *H04W 24/02* (2013.01); *H04W 16/14* (2013.01); *H04W 72/1215* (2013.01)

(58) Field of Classification Search
CPC ........................................ H04W 72/00–72/14
See application file for complete search history.

(56) References Cited

U.S. PATENT DOCUMENTS

| 2008/0008147 | A1 | 1/2008 | Nakayama |
| 2012/0021689 | A1 | 1/2012 | Han |
| 2014/0024388 | A1* | 1/2014 | Earnshaw et al. ......... 455/452.2 |
| 2015/0382346 | A1* | 12/2015 | Khandekar ....... H04W 72/0446 370/280 |

FOREIGN PATENT DOCUMENTS

| EP | 2603030 A1 | 6/2013 |
| WO | 2011/092370 A1 | 8/2011 |
| WO | 2012/089269 A1 | 7/2012 |
| WO | 2012/097433 A1 | 7/2012 |
| WO | 2013/007010 A1 | 1/2013 |

OTHER PUBLICATIONS

"IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications", IEEE Std 802.11, Mar. 29, 2012, pp. 1-2793.
PCT Application No. PCT/US2013/049429, "Performing Measurements in Wireless Network", filed on Jul. 5, 2013, 41 pages.

(Continued)

*Primary Examiner* — Pao Sinkantarakorn
(74) *Attorney, Agent, or Firm* — Harrington & Smith

(57) ABSTRACT

This document discloses a solution for reducing interference between wireless networks. According to an aspect, a method comprises: acquiring, by an access node of a first wireless network from at least one node of the first wireless network, information on at least one interfering node of a second wireless network; generating, by the access node, mapping information between the node of the first wireless network and said at least one interfering node; and causing, by the access node, transmission of the mapping information to another access node of the second wireless network.

18 Claims, 6 Drawing Sheets

(56) References Cited

OTHER PUBLICATIONS

"IEEE 802.11 High Efficiency WLAN Study Group Created", IEEE Standards Association, Retrieved on Apr. 15, 2014, Webpage available at : http://standards.ieee.org/news/2013/IEEE_802.11_HEW.html.

Partial European Search Report received for corresponding European Patent Application No. 14180002.9, dated Feb. 5, 2015, 6 pages.

Extended European Search Report received for corresponding European Patent Application No. 14180002.9, dated Apr. 22, 2015, 12 pages.

* cited by examiner

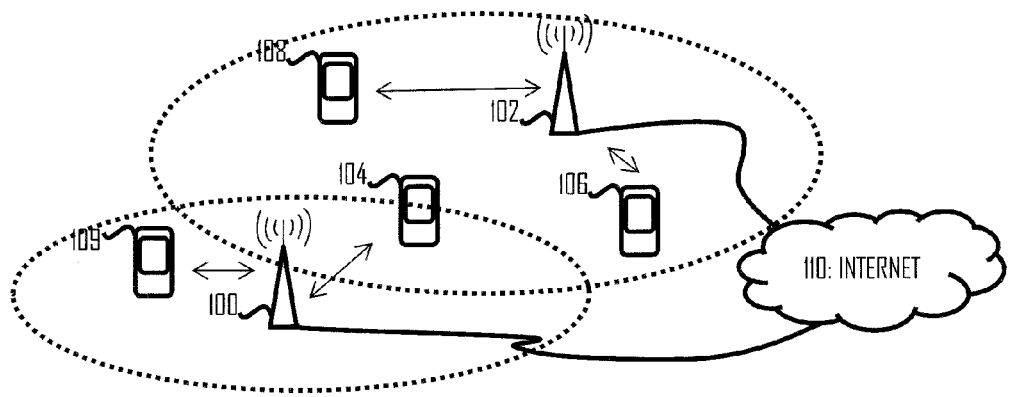
Fig 1
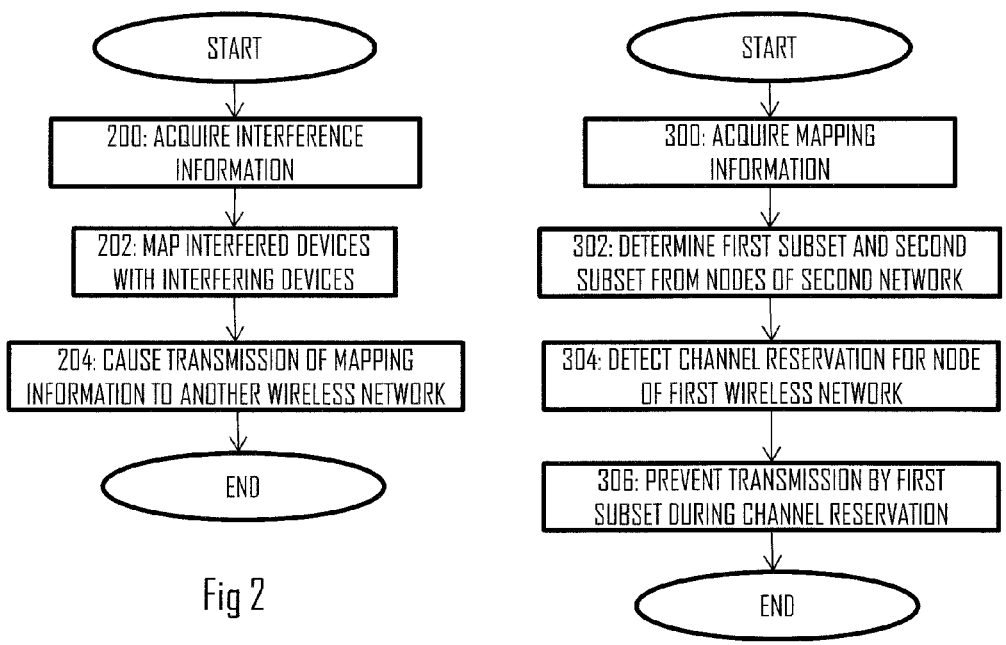
Fig 2
Fig 3

INTERFERENCE AVOIDANCE BETWEEN OVERLAPPING WIRELESS NETWORKS

FIELD

The invention relates to the field of wireless networks and, particularly, to avoiding interference between overlapping wireless networks.

BACKGROUND

Wireless apparatuses of a wireless network may perform channel measurements for various purposes, e.g. in order to detect other wireless networks or to test channel conditions between two wireless apparatuses of the same wireless network.

BRIEF DESCRIPTION

According to an aspect, there is provided a method comprising: acquiring, by an access node of a first wireless network from at least one node of the first wireless network, information on at least one interfering node of a second wireless network; generating, by the access node, mapping information between the node of the first wireless network and said at least one interfering node; and causing, by the access node, transmission of the mapping information to another access node of the second wireless network.

In an embodiment, the method further comprises causing transmission of a channel reservation message reserving channel for the node of the first wireless network, wherein the mapping information is transmitted in connection with the channel reservation message. In an embodiment, the mapping information is transmitted in a separate frame after the channel reservation message. In an embodiment, the channel reservation message comprises an information element indicating that the mapping information frame will be transmitted after the channel reservation message. In an embodiment, the mapping information is transmitted in the channel reservation message.

In an embodiment, the mapping information specifies a time interval when the node of the first wireless network is requested to be protected from interference by the at least one interfering node.

In an embodiment, the channel reservation message is a scheduling message defining a contention-free period for the node of the first wireless network.

According to another aspect, there is provided a method comprising: acquiring, by a first access node of a first wireless network from a second access node of a second wireless network, mapping information mapping at least one node of the second wireless network with at least one node of the first wireless network; determining, by the first access node on the basis of the mapping information, at least a first subset and a second subset from nodes of the first wireless network; acquiring, by the first access node, information on a channel reservation for the at least one node of the second wireless network; preventing, by the first access node, transmission by at least one node of the first subset during the channel reservation while allowing transmission by at least one node of the second subset during the channel reservation.

In an embodiment, the channel reservation specifies a contention-free period. In an embodiment, the method further comprises in the first access node: establishing a second contention-free period for a subset of nodes of the first wireless network, wherein the second contention-free period overlaps with the contention-free period of the least one node of the second wireless network, and wherein the subset of the nodes of the first wireless network excludes the first subset.

According to an aspect, there is provided a computer program product embodied on a distribution medium readable by a computer and comprising program instructions which, when loaded into an apparatus, execute any one of the above-described methods.

According to another aspect, there is provided an apparatus comprising: at least one processor and at least one memory including a computer program code. The at least one memory and the computer program code are configured, with the at least one processor, to cause the apparatus to: acquire, as originated from at least one node of a first wireless network, information on at least one interfering node of a second wireless network; generate mapping information between the node of the first wireless network and said at least one interfering node; and cause transmission of the mapping information to an access node of the second wireless network.

In an embodiment, the at least one memory and the computer program code are configured, with the at least one processor, to cause the apparatus to cause transmission of a channel reservation message reserving channel for the node of the first wireless network, wherein the mapping information is transmitted in connection with the channel reservation message.

In an embodiment, the mapping information is transmitted in a separate frame after the channel reservation message.

In an embodiment, the channel reservation message comprises an information element indicating that the mapping information frame will be transmitted after the channel reservation message.

In an embodiment, the mapping information is transmitted in the channel reservation message.

In an embodiment, the mapping information specifies a time interval when the node of the first wireless network is requested to be protected from interference from the at least one interfering node.

In an embodiment, the channel reservation message is a scheduling message defining a contention-free period for the node of the first wireless network.

According to another aspect, there is provided an apparatus comprising: at least one processor and at least one memory including a computer program code. The at least one memory and the computer program code are configured, with the at least one processor, to cause the apparatus to: acquire mapping information mapping at least one node of a first wireless network with at least one node of a second wireless network, wherein the mapping information is originated from an access node of the second wireless network; determine, on the basis of the mapping information, at least a first subset and a second subset from nodes of the first wireless network; acquire information on a channel reservation for the at least one node of the second wireless network; prevent transmission by at least one node of the first subset during the channel reservation while allowing transmission by at least one node of the second subset during the channel reservation.

In an embodiment, the channel reservation specifies a contention-free period.

In an embodiment, the at least one memory and the computer program code are configured, with the at least one processor, to cause the apparatus to establish a second contention-free period for a subset of nodes of the first wireless network, wherein the second contention-free period overlaps with the contention-free period of the least one node of the second wireless network, and wherein the subset of the nodes of the first wireless network excludes the first subset.

In an embodiment, any one of the above-described apparatuses further comprises radio interface components configured to provide the apparatus with radio communication capability.

According to an aspect, there is provided a computer program product embodied on a distribution medium readable by a computer and comprising program instructions which, when loaded into an apparatus, execute a computer process comprising: acquiring mapping information mapping at least one node of a first wireless network with at least one node of a second wireless network, wherein the mapping information is originated from an access node of the second wireless network; determining, on the basis of the mapping information, at least a first subset and a second subset from nodes of the first wireless network; acquiring information on a channel reservation for the at least one node of the second wireless network; preventing transmission by at least one node of the first subset during the channel reservation while allowing transmission by at least one node of the second subset during the channel reservation.

According to another aspect, there is provided a computer program product embodied on a distribution medium readable by a computer and comprising program instructions which, when loaded into an apparatus, execute a computer process comprising: acquiring, as originated from at least one node of a first wireless network, information on at least one interfering node of a second wireless network; generating mapping information between the node of the first wireless network and said at least one interfering node; and causing transmission of the mapping information to an access node of the second wireless network.

Embodiments of the invention are defined in the dependent claims.

LIST OF DRAWINGS

Embodiments of the present invention are described below, by way of example only, with reference to the accompanying drawings, in which FIG. 1 illustrates a wireless communication scenario to which embodiment of the invention may be applied;

FIGS. 2 and 3 illustrate flow diagrams of processes for carrying out interference avoidance in a wireless network according to some embodiments of the invention;

Figure 9:
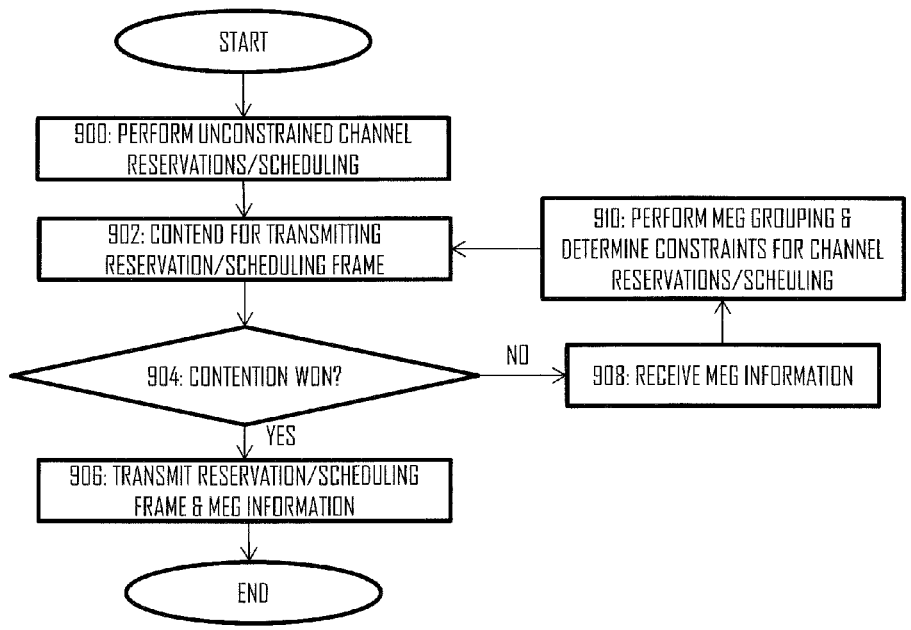
Figure 10:
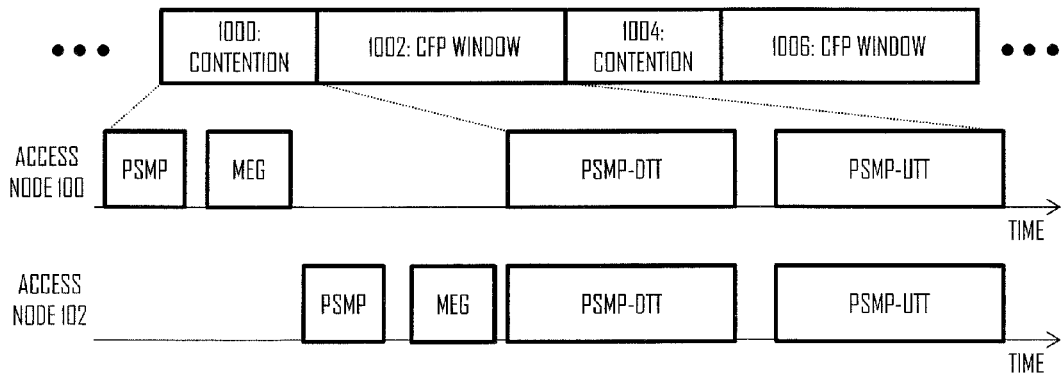
Figure 11:
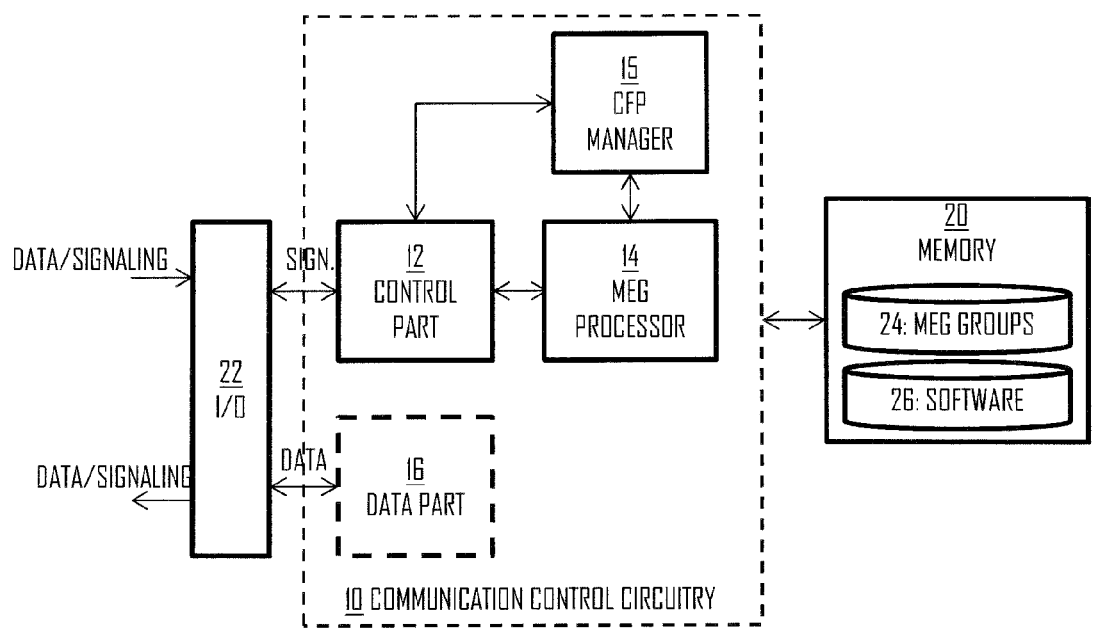

FIGS. 9 and 10 an embodiment for performing channel reservations when employing the mutual exclusion groups according to some embodiments of the invention; and FIG. 11 illustrates a block diagram of an apparatus according to an embodiment of the invention.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

A general wireless communication scenario to which embodiments of the invention may be applied is illustrated in FIG. 1. FIG. 1 illustrates wireless communication devices comprising access points (AP) 100, 102 and a plurality of terminal devices (STA) 104, 106, 108, 109. The AP 100, 102 may be a stationary access point or a mobile access point. A general term used in this specification and encompassing both the APs and STAs is a wireless apparatus. The access point may refer to an access point specified in IEEE 802.11 specifications or to a base station of another wireless access network. At least one of the terminal devices 104 to 109 may have a functionality of an AP as well. Therefore, a common term encompassing both the stationary APs 100 and mobile APs is an access node. An access node may provide or be comprised in a basic service set (BSS) which is a basic building block of an IEEE 802.11 wireless local area network (WLAN). Each access node may represent a different BSS. The most common BSS type is an infrastructure BSS that includes a single access node together with all STAs associated with the access node. The access node may provide access to other networks, e.g. the Internet 110. In another embodiment, the BSSs may be connected with each other by a distribution system (DS) to form an extended service set (ESS). An independent BSS (IBSS) is formed by an ad hoc network of terminal devices without a stationary controlling AP. In a context where two BSSs have overlapping coverage areas, one BSS may be considered as an overlapping BSS (OBSS) from the viewpoint of the other BSS. While embodiments of the invention are described in the context of the above-described topologies of IEEE 802.11, it should be appreciated that these or other embodiments of the invention may be applicable to wireless networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, the following description may be generalized to may systems as well.

The different access nodes may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11 ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless apparatuses of the wireless network may carry out channel contention. The access node may define the RAW and a group of wireless apparatuses that are allowed to attempt the channel access within the RAW. Grouping allows partitioning of the wireless apparatuses into groups and restricting channel access only to wireless apparatuses belonging to a specified group at any given time period. The time period may be enabled by allocating slot duration and a number of slots in RAW access. The grouping may help to reduce contention by restricting access to the medium only to a subset of the wireless apparatuses. The grouping may also reduce the signalling overhead.

As described above, the BSS may be represented by the access node and one or more terminal devices connected to the access node. A terminal device may establish a connection with any one of the access nodes it has detected to provide a wireless connection within the neighbourhood of the terminal device. In the example of FIG. 1, terminal devices 106, 108 are located within the coverage area of the access node 102 so they may establish a connection to that access node 102. Similarly, the terminal device 109 may establish a connection to the access node 100. The terminal device 104 is located in an area where the coverage areas represented by the dotted circles overlap and, thus, the terminal device 104 may establish a connection to either access node 100, 102. Now, let us assume that the terminal device 104 connects to the access node 104. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

Wireless apparatuses may be configured to carry out measurements in order to detect new access nodes and/or to measure overlapping wireless networks and their wireless apparatuses. The measurements may be carried out with a purpose of making an association to a new access node or reporting the presence or parameters of neighbouring wireless networks to an access node currently associated to a terminal device. The terminal device may carry out the measurements by scanning for signals transmitted by wireless apparatuses of other wireless networks, e.g. wireless apparatuses that do not belong to the wireless network of the terminal device. Upon detecting a signal transmitted by such a wireless apparatus, the terminal device may report the detected wireless apparatus to the associated access node.

Overlapping wireless networks may be prone to interfere with one another. Referring to FIG. 1, the terminal device 104 located in the area where coverage areas of the wireless networks overlap may be susceptible to interference from the terminal devices 106, 108 and the access node 102. Similarly, the terminal device 104 may be a source of interference for the terminal devices 106, 108 and the access node 102. In some situations, interference between the terminal device 109 and the terminal devices 106, 108 and/or the access node 102 may be possible even though the terminal device 109 is not located in the overlapping area.

An embodiment provides an interference avoidance mechanism for use between overlapping wireless networks. A wireless apparatus or, as used below, a node of a wireless network may perform interference measurements by scanning for signals transmitted by nodes of another wireless network and, if such a signal is detected, compute an interference metric representing the amount of interference caused by the detected node. The interference metric may be, for example, a received signal strength indicator (RSSI), reception power indicator, or another metric representing received signal strength of the detected signal in the measuring node. The measuring node may compare the interference metric with an interference threshold when determining whether or not the detected node is a potential interferer. When the interference metric exceeds the interference threshold, the measuring node may determine that the detected node causes interference. The measuring node may further identify the interfering node from the received signal. For example, in 802.11 networks a frame comprises a transmitter address identifying a transmitter of the frame, and the measuring node may identify the transmitter from the transmitter address. The measuring node may then send a measurement report to an access node of its wireless network, wherein the measurement report may comprise the identifier(s) of detected node(s) of other wireless network(s) and at least one indicator indicating whether or not the detected node(s) cause interference towards the measuring node.

The above-described measurement report may comprise interference information that may be used for interference avoidance between overlapping wireless networks. FIG. 2 illustrates a flow diagram of a process for interference avoidance in the access node storing the interference information. Referring to FIG. 2, the access node acquires the interference information in block 200. The interference information may be acquired from at least one node of the first wireless network and it may comprise information on at least one interfering node of a second wireless network. The interference information may be measured by a terminal device of the wireless network or by the access node itself. In block 202, the access node generates mapping information between the node of the first wireless network and said at least one interfering node. Block 202 may comprise forming a table comprising identifiers of interfering nodes of the other wireless network or networks. The interfering nodes may be sorted in the table according to a determined criterion, e.g. they may be classified according to the degree of interference they cause or they may be sorted into an ascending or descending order according to the degree of interference. The access node may acquire such mapping information for each terminal device and the access node itself and store it in its memory. As a result, the access node acquires mappings between nodes that interfere with one another. In block 204, the access node transmits the mapping information to another access node of a second wireless network.

FIG. 3 illustrate a flow diagram of a process executed by the other access node of the second wireless network upon receiving the mapping information. Referring to FIG. 3, the access node acquires in block 300 the mapping information mapping at least one node of the first wireless network with at least one node of the second wireless network. In block 302, the access node determines, on the basis of the mapping information, at least a first subset and a second subset from nodes of the second wireless network. In block 304, the access node receives information on a channel reservation for the at least one node of the first wireless network. Upon detecting the channel reservation, the access node may check the mapping information and determine whether or not one or more nodes of the second wireless nodes are comprised in the first subset mapped to the node associated with the channel reservation. If such a subset is detected, the access node may prevent transmission by the first node subset during the channel reservation (block 306). The access node may allow transmission by the second subset during the channel reservation.

The above-described embodiments reduce inter-network interference. Even though the mapping interference indicates that the overlapping networks interfere with one another, simultaneous transmissions may still be enabled without interference. Accordingly, the capacity degradation caused by limiting the transmissions may even be avoided.

In an embodiment, the node of the first wireless network to which the mapping information maps the first and second subsets of nodes of the second wireless network may be a node affected by the first subset of nodes. The second subset of nodes of the second wireless network may not affect the operation of the node and, therefore, their transmission simultaneously with the affected node may be allowed. In an embodiment the type of effect caused by the first subset on the affected node is the interference. Accordingly, the first subset may be understood as an interfering node subset, while the second subset may be considered as a non-interfering node subset. Below, the effect between the nodes of the different wireless networks is described in the context of interference.

In an embodiment, the interfering node subset and the non-interfering node subset may be formed for each interfered node of the first wireless network on the basis of the mapping information. Accordingly, the access node of the second wireless network may dynamically adjust the subsets of transmitting nodes in its wireless network on the basis of channel reservations of the first wireless network. Similar mapping information may be exchanged in the other direction, e.g. the access node of the second wireless network may send the corresponding mapping information to the access node of the first wireless network.

The mapping information may be understood as defining one or more interfering node subsets or, in other words, mutual exclusion groups (MEG), wherein a MEG maps one or more interfering nodes of one wireless network with an interfered node of another wireless network. Interfering nodes of the MEG are prevented from transmitting whenever a channel reservation or transmission by the interfered node is detected. An access node controlling transmissions in the network of the interfering nodes may carry out the preventing by scheduling transmission(s) only to the non-interfering node subset during the reservation of the interfered node.

Figure 4:
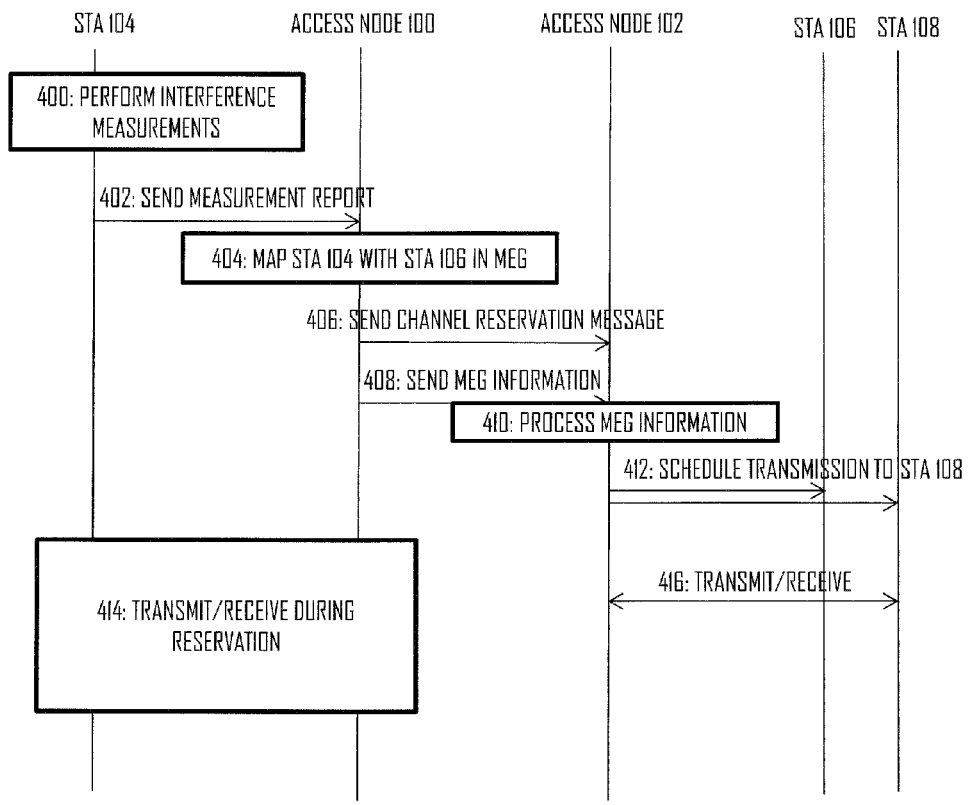
FIG. 4 illustrates a signalling diagram for using mutual exclusion groups to avoid inter-network interference according to an embodiment of the invention.

FIG. 4 illustrates a signalling diagram of an embodiment for using the interference avoidance in the wireless network of FIG. 1. Referring to FIG. 4, the terminal device 104 carries out the above-described measurements in block 400. The measurements may comprise scanning for nodes of other wireless networks and measuring RSSI or a corresponding metric for the detected nodes and forming a measurement report. The terminal device 104 may send the measurement report to the access node 100 in step 402. The measurement report may comprise, as the interference information, the identifiers of the detected node(s) and RSSI or the corresponding metrics in association with each identifier. Let us assume that the terminal device 104 has detected the terminal devices 106 and 108 and that the measurement report comprises the following information of Table 1:

TABLE 1

| Identifier | RSSI |
|---|---|
| STA 106 | X |
| STA 108 | Y |

In block 404, the access node 100 generates the mapping information by creating the MEG for the terminal device 104 on the basis of the received interference information. The access node 100 may compare the RSSI values with the interference threshold and include an identifier of a terminal device associated with the RSSI exceeding the threshold in the MEG. For example, let us assume that the RSSI of the terminal device 106 (X) exceeds the interference threshold and the RSSI of the terminal device 108 (Y) does not exceed the interference threshold. Accordingly, the terminal device 106 may be included in the MEG of the terminal device 104 but the terminal device 108 may be excluded from the MEG of the terminal device 104. The terminal device 106 thus forms the interfering node subset and the terminal device 108 forms the non-interfering node subset with respect to the terminal device 104. A similar procedure may be carried out for the other nodes, e.g. the terminal device 109 and the access node 100 but let us omit them for the sake of clarity and conciseness.

In an embodiment, distribution of the mapping information is linked to the transmission of channel reservation messages. The access node 100 may transmit the mapping information, e.g. the MEG, in connection with transmitting a channel reservation message. Referring to FIG. 4, the access node 406 may determine and announce a transmission time interval for the terminal device 104 and transmit a channel reservation message in step 406. The channel reservation message may define a contention-free period during which the terminal device 104 is allowed to transmit frames without channel contention with other nodes. In an embodiment, the channel reservation message is a power-save multipoll (PSMP) message of 802.11 networks. In another embodiment, the channel reservation message is a message of a hybrid coordination function controlled channel access (HCCA) of the 802.11 networks. After transmitting the channel reservation message, the access node 100 may transmit a frame comprising the MEG information (step 408). The access node 102 may scan for frames transmitted by other nodes of neighbouring wireless networks and, as a consequence, it may detect the frames transmitted in steps 406 and 408. Upon receiving the channel reservation message and the MEG information, the access node 102 may process the MEG information in block 410. Block 410 may comprise cross-referencing the channel reservation message, the MEG information, and determine nodes of its network identified in the MEG information in association with the node for which the channel reservation has been indicated in the channel reservation message. As a result, the access node 102 determines the node(s) of its network that are identified as the interfering node subset towards the node owning the channel reservation. The access node 102 may further determine the node(s) of its network that are in the non-interfering node subset. In the present example, as the terminal device 106 has been identified in the MEG information, it is comprised in the interfering node subset, while the terminal device 108 is comprised in the non-interfering node subset.

Upon determining the interfering node subset and the non-interfering node subset associated with the detected channel reservation, the access node 102 may control transmissions in its network accordingly. The access node 102 may control the transmissions such that the non-interfering node subset is allowed to carry out frame transmissions and the interfering node subset is configured to defer frame transmissions during the channel reservation. In some embodiments, the access node 102 may schedule transmissions exclusively to the non-interfering node subset during the reservation. Referring to FIG. 4, the access node 102 schedules a frame transmission slot to the terminal device 108 in step 412. The frame transmission slot may be scheduled to overlap with the channel reservation of the terminal device 104 in time. The terminal device 106 belonging to the interfering node subset detects the scheduling and refrains from transmitting any frames for at least a duration specified in the scheduling of step 412. The scheduling carried out in step 412 may be a corresponding channel reservation as that carried out in step 406, e.g. it may specify a contention-free period for the terminal device 108. A scheduling frame transmitted by the access node 412 may be a PSMP frame or a HCCA contention-free poll frame, for example. In block 414, the terminal device 104 owning the reservation may carry out frame transmissions without contention and without interference from the interfering node subset, while the non-interfering node subset may carry out frame transmissions in step 416 and utilize the available capacity without degrading the performance of the terminal device 104.

Figure 5:
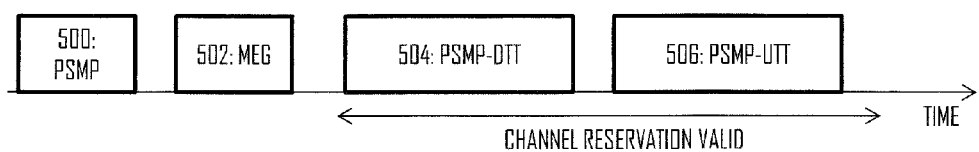
FIG. 5 illustrates an embodiment for transmitting frames in the procedure of FIG. 4.

FIG. 5 illustrates the frame transmissions in steps 406, 408, and 414 of FIG. 4. The channel reservation message transmitted in step 406 may comprise an information element indicating that the transmission of the MEG information follows the transmission of the channel reservation message. The information element may indicate that the transmission of the MEG information occurs after the channel reservation message and before the frames transmitted when the reservation is valid (see FIG. 5). In the embodiments using the PSMP to carry out the channel reservation in step 406, the access node 100 may transmit a PSMP frame of 802.11 networks in block 500. The PSMP frame may have the following structure:

TABLE 2

| MAC Header | Command | HT Action | FCS |
| --- | --- | --- | --- |
| 24 bytes | 1 byte | Variable | 4 bytes |

The PSMP frame may comprise a medium access control (MAC) header, a frame body comprising a command field and a high throughput (HT) action field, and a frame checksum element for error correction. The structure of the 802.11 PSMP frames and their elements illustrated in Table 2 are considered known to a person skilled in the art. The HT Action field may have the following form:

TABLE 3

| Action | PSMP Parameter Set | PSMP STA #1 Info | ... | PSMP STA #N Info |
| --- | --- | --- | --- | --- |
| 1 byte | 2 bytes | 8 bytes | ... | 8 bytes |

Referring to Table 3, the PSMP STA Info may indicate the channel reservation for a given node, e.g. the terminal device 104 in the present example. As shown in Table 3, the access node 100 may specify channel reservations for multiple nodes in a single PSMP frame. Each PSMP STA Info field may have the following elements:

TABLE 4

| Type | PSMP-DTT Start Offset | PSMP-DTT Duration | STA_ID | PSMP-UTT Start Offset | PSMP-UTT Duration | MEG | Reserved |
| --- | --- | --- | --- | --- | --- | --- | --- |
| 2 bits | 11 bits | 8 bits | 16 bits | 11 bits | 10 bits | 1 bit | 5 bits |

Element PSMP-Downlink Transmission Time (DTT) Offset and Duration may be used to specify a transmission time slot for downlink transmissions (from the access node to the terminal device) in terms of start time and duration, respectively. STA_ID field may specify the terminal device owning the reservation, e.g. the terminal device 104 in the present example. PSMP-Uplink Transmission Time (UTT) Offset and Duration may be used to specify a transmission time slot for uplink transmissions (from the terminal device to the access node) in terms of start time and duration, respectively. The MEG element may be used to indicate whether or not the MEG information will be transmitted after the PSMP frame. Similar bit may be assigned in other channel reservation messages.

Referring to FIGS. 4 and 5, the access node 100 transmits a MEG frame 502 in step 408. The MEG frame may have the following structure:

TABLE 5

| Frame Control | Duration | Source MAC | MEG Header | CRC |
| --- | --- | --- | --- | --- |
| 2 octets | 2 octets | 6 octets | Variable | 4 octets |

Frame control field may contain control information, and Duration field may specify the duration of the MEG frame. Source MAC address field may comprise a MAC address of the node transmitting the MEG frame, e.g. the MAC address of the access node 100 in the present example. A cyclic redundancy check (CRC) field may contain error correction bits. A MEG Header may comprise the following fields:

TABLE 6

| N_MEGS | MEG Field 1 | ... | MEG Field N |
|---|---|---|---|
| 1 octet | Variable | ... | Variable |

An N_MEGS field may specify the number of MEG fields comprised in the MEG header. The number may correspond to the number of channel reservations indicated in the channel reservation message, e.g. the number of PSMP STA fields in Table 3. In other embodiments, the number of MEG fields may differ from the number of indicated channel reservations, e.g. when one or more reservation owning nodes does not have a MEG, e.g. there is no detected interference or the measurements have not been carried out.

A MEG field of Table 6 may have a following structure:

TABLE 7

| Options | Offset | Duration | STA_ID | N_OBSS STAS | OBSS STA_ID | ... | OBSS STA_ID |
|---|---|---|---|---|---|---|---|
| 1 octet | 2 octets | 2 octets | Variable | 1 octet | Variable | ... | Variable |

MEG Field Options may be a one-octet bitmap indicating configuration options for the MEG Field. The MEG Field Options may have the following structure:

TABLE 8

| Localized | Local BSSID | Local Addr Type | Remote BSSID | Reserved |
|---|---|---|---|---|
| 1 bit | 1 bit | 2 bits | 1 bit | 3 bits |

A bit referred to as "Localized" may indicate whether the optional fields MEG Offset and MEG Duration are present in Table 7. A bit named Local BSSID may indicates whether or not a network address (e.g. BSS identifier) for the terminal device to be protected by this MEG Field (the terminal device 104) is included in the STA_ID field of Table 7. Bits named Local Addr Type may indicate a 2-bit integer code corresponding to a specific type of addressing scheme used to identify the terminal device to be protected by this MEG Field. For instance, if the access node 100 wants to represent the entire MAC Address, then a code value 0x01 may be used, while another code value 0x00 may be reserved for informing that the address of the terminal device 104 shall not be included in the STA_ID sub-field of Table 7. For example, the STA_ID may be omitted if the channel reservation message already contains the STA_ID and the association between the channel reservation and the corresponding MEG field is explicit. The bit named as Remote BSSID may indicate whether or not the network address for the terminal device to be blocked by this MEG Field (e.g. the terminal device 106) is included in the OBSS STA ID sub-field of Table 7. The other bits may be reserved for future usage.

Referring to Table 7, the sub-fields named MEG Offset and MEG Duration may indicate the time period when the protection should be enforced (e.g. in units of 8 microseconds, µs). Their presence in this MEG field may be optional and defined by the value of the Localized bit in the sub-field MEG Field Options. For example, when the channel reservation message already specifies the time period of the channel reservation, the definition of the same time period in the MEG information may be redundant and omitted.

The sub-field named STA_ID may include the (optional) network address and the MAC Address of the node for which the protection through the MEG defined in this MEG Field is requested. If the bit Local BSSID is marked with value indicating the presence of the network address, this STA_ID sub-field may start with a 6-octet network address. Then, the presence and size of the MAC Address contained in this STA_ID sub-field may be indicated by the code value in the Local Addr Type bits in the sub-field MEG Field Options.

The sub-field named N_OBSS STAS may be an unsigned integer one-octet counter of the number of nodes comprised in the interfering node subset, e.g. nodes that are requested not to transmit while the node owning the reservation is transmitting or receiving.

The sub-field named OBSS STA_ID may include the network address (optional) and the MAC Address of the node of the neighboring wireless network which is requested to be silenced for the duration of the reservation. Since more than one such a node may be listed in a MEG, a plurality of these sub-fields may be allocated in a sequence, and the number these two-field combinations may be indicated in the sub-field N_OBSS STAS. If the bit Remote BSSID is marked with one value in the sub-field MEG Field Options, this STA_ID sub-field may start with a 6-octets network address. Then, 6-octet MAC Address of the OBSS STA may be included in the OBSS_STA_ID field.

Referring to FIG. 5, the downlink and uplink transmissions 504, 506 may then occur between the terminal device 104 and the access node 100 after the transmission of the MEG frame and during the reservation without contention and with reduced interference.

Figure 6:
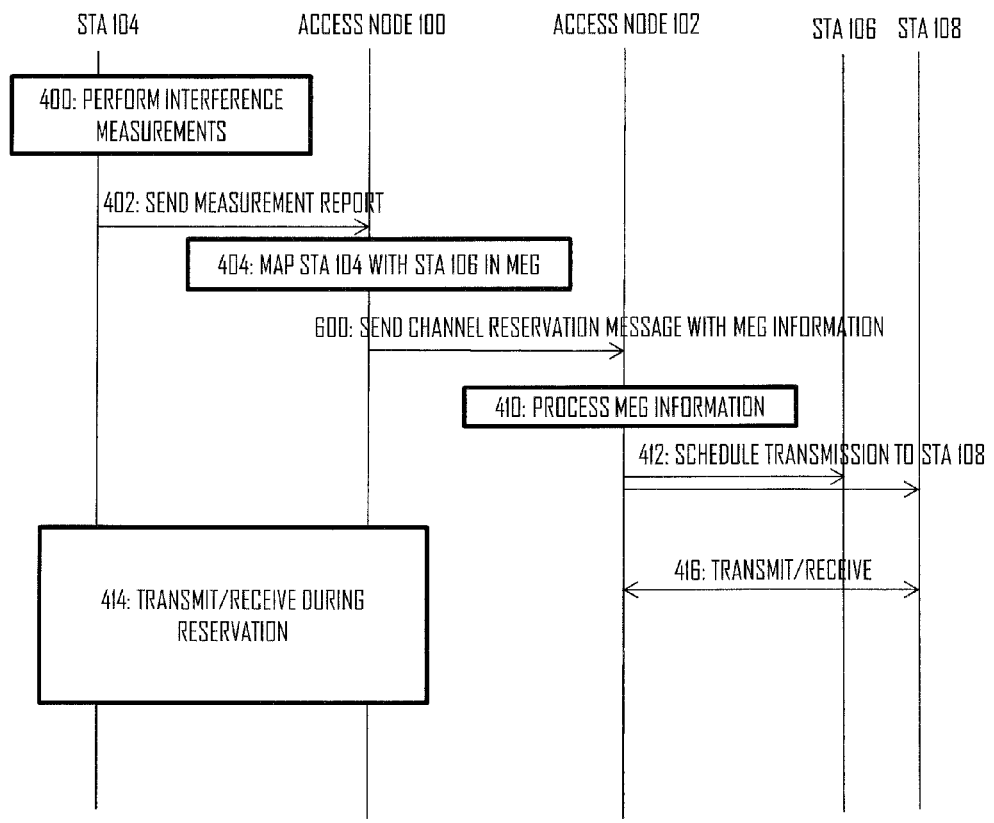
FIGS. 6 and 7 illustrate another embodiment for using the mutual exclusion groups to avoid the inter-network interference.

FIG. 6 illustrates another embodiment where the access node transmits the MEG information in the channel reservation message in step 600. Except for this feature, the procedure may be substantially similar to the embodiment of FIG. 5. In block 410, the access node receiving the channel reservation message extracts the MEG information from the channel reservation message and processes it in the above-described manner.

Figure 7:
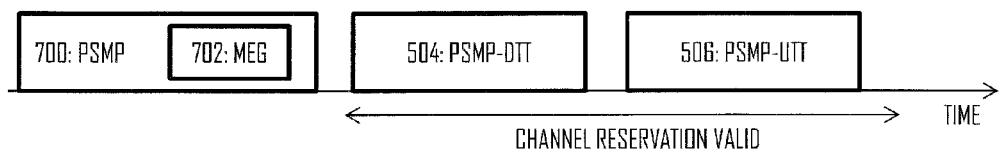

FIG. 7 illustrates the channel reservation message 700 comprising the MEG information 702. Referring to the above-described embodiment of the PSMP frame of Table 2, the HT Action field may in this embodiment have the following structure:

TABLE 9

| Action | PSMP Parameter Set | PSMP STA Info #1 | MEG Field #1 | ... | PSMP STA Info #N | MEG Field #N |
|---|---|---|---|---|---|---|
| 1 octet | 2 octets | 8 octets | Variable | ... | 8 octets | Variable |

In this embodiment, the PSMP STA Info field of Table 4 may comprise an information element indicating that the PSMP frame comprises the MEG information. In the embodiments supporting both the separate MEG frame and the channel reservation message comprising the MEG information, the PSMP STA Info field may comprise a separate indicator for indicating the presence of each alternative, e.g. a one-bit indicator indicating whether or not the MEG frame follows the PSMP frame and another one-bit indicator indicating whether or not the MEG information is comprised in the PSMP frame.

Referring to Table 9, the Action field may have a unique value identifying the HT Action field comprising the MEG information among other HT Action fields. Each channel reservation as indicated by the PSMP STA info fields may have a corresponding MEG field indicating the MEG information for the owner of the channel reservation. The PSMP STA info field may have the structure described above in connection with Table 4, and the MEG field may have the structure described above in connection with Table 7.

Figure 8:
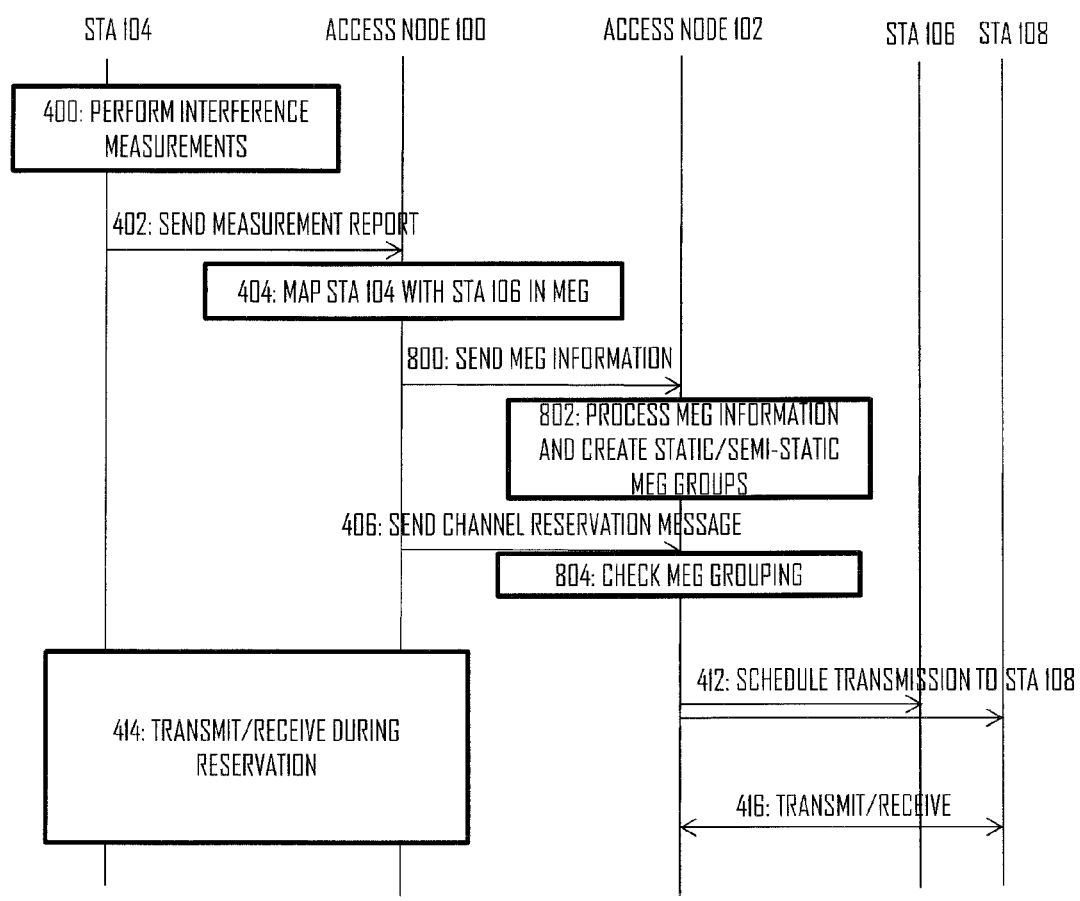
FIG. 8 illustrates an embodiment for using the static or semi-static mutual exclusion groups to avoid the inter-network interference.

FIG. 8 illustrates yet another embodiment for transmitting the MEG information. The embodiment of FIG. 8 may employ static or semi-static MEG information in such manner that the same MEG information may be employed over a plurality of separate channel reservations for a single node. Referring to FIG. 8, the access node 100 may transmit the MEG information in a MEG frame in step 800. In the embodiment of FIG. 8, the MEG frame may be transmitted without first transmitting the channel reservation message. The MEG frame may have the structure described above in connection with FIG. 5, for example. Upon receiving the MEG frame, the access node 102 may process the MEG information contained in the MEG frame and create the MEGs that may be used as static or semi-static groupings. As described above, the MEG grouping may comprise the mapping information linking one or more interfering nodes of one wireless network to an interfered node of another wireless network.

In step 406, the access node 100 transmits the channel reservation message indicating channel reservation for the terminal device 104. Upon receiving the channel reservation message, the access node 102 may check the MEG group of the node owning the reservation in block 804. The access node 102 may retrieve the static MEG grouping formed in block 802 and determine the one or more nodes deemed to interfere with the node owning the reservation. In the present example, the access node 102 thus gains the information that the terminal device 106 interferes with the terminal device 104 while the terminal device 108 does not. Accordingly, the access node may silence the interfering terminal device 106 and allow the other terminal device 108 to transmit during the reservation. Upon receiving subsequent channel reservation messages, the access node 102 may again check the static grouping when determining the interfering node subset and the non-interfering node subset with respect to the owner of the reservation. Upon acquiring a new MEG frame, the access node 102 may carry out block 802 and update the MEG grouping according to the new MEG information comprised in the newly received MEG frame.

When using the static or semi-static MEG grouping, signaling and processing overhead may be reduced. With respect to the update of the MEG information, the access node 100 may send a new MEG frame when it detects that the MEG information has changed, e.g. one or more of the terminal devices of its network carry out measurements and detect new interfering nodes or that previous interfering nodes no longer cause interference. In another embodiment, a time-based update may be employed instead of the event-based update, e.g. the access node 100 may transmit the MEG frame periodically. The MEG frame may be transmitted in connection with a beacon message, for example. In another embodiment, the MEG frame may be transmitted as a separate message.

With respect to carrying the measurements and establishing the mapping information, the nodes of the wireless networks may perform the measurements periodically and/or upon request from the access node. For example, the access node 100 may solicit the interference measurements from the terminal devices that have reported that they have detected an overlapping wireless network.

In an embodiment, MEG information based on earlier measurements may be maintained by at least one of the access nodes 100, 102 even in the case where new measurements do not comprise a previously-reported interfering node. The access node(s) may delete the interfering node or nodes from the MEG information after a determined non-zero time period has elapsed from the detection that the previously interfering node no longer causes interference. This type of delay may eliminate a ping-pong effect caused by sudden disappearance and reappearance of an interfering node.

FIG. 9 illustrates a flow diagram for constraining channel reservations by using the mapping information in the access node 100, 102. Referring to FIG. 9, let us assume an initial situation where no mapping information has been formed and the access node may schedule transmissions in its network without considering interference towards nodes of an overlapping network. Accordingly, the access node may perform unconstrained channel reservations and scheduling in block 900. Block 900 may comprise determining contention-free periods without considering the MEG information. In block 902, the access node carries out channel contention to transmit a reservation or a scheduling frame indicating the contention-free period. If the access node wins the contention in block 904, it gains access to transmit the frame in block 906. Thereafter, the process may return to block 900. On the other hand, if the access node loses the contention, the process may proceed to block 908 in which the access node receives the MEG information from another access node. On the basis of the MEG information, the access node may determine the interfering node subset and the non-interfering node subset in the above-described manner in block 910. Thereafter, the access node may perform constrained channel reservations in such manner that if it detects a valid reservation by a node of another network, the access node may check the MEG grouping and determine a non-interfering node subset for the node and make a channel reservation only for a member of the non-interfering node subset. The constrained reservation may be made in block 906, provided that the access node wins channel contention in blocks 902 and 904.

FIG. 10 illustrates a diagram of the embodiment of FIG. 9. Referring to FIG. 10, contention windows 1000, 1004 and contention-free periods 1002, 1006 may alternate in the time domain. The access nodes 100, 102 may negotiate the channel reservations by carrying out the process of FIG. 9. For example, the access node 100 wins the first contention of the contention window 1000 and, thus, it may carry out the unconstrained channel reservation and transmit the channel reservation message and the MEG information first. The access node 102 loses the channel contention and receives the MEG information from the access node 100 (block 908). As a consequence, the access node may make the constrained channel reservation for the contention-free period 1002 by scheduling the contention-free period to only the non-interfering node subset. Then, the downlink transmissions and the uplink transmissions may be carried out simultaneously in the two wireless networks during the contention-free period 1002. During the subsequent contention window, the access nodes may again carry out the channel contention and the access node winning the first contention may perform the unconstrained channel reservation while the other access node may perform the constrained channel reservation. In the contention window 1004, the access node 102 may gain the opportunity for the unconstrained channel reservation, if it wins the contention. In this manner, the constrained and the unconstrained channel reservations may change dynamically according to the results of the contention in each contention window 1000, 1004.

FIG. 11 illustrates an embodiment of an apparatus comprising means for carrying out the above-mentioned functionalities of the access node. The access node may be a wireless apparatus which complies with specifications of an IEEE 802.11 network or another wireless network. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a base station with routing functionalities, or any other apparatus provided with radio communication capability. In another embodiment, the apparatus carrying out the above-described functionalities of the serving apparatus is comprised in such a wireless apparatus, e.g. the apparatus may comprise a circuitry, e.g. a chip, a processor, a micro controller, or a combination of such circuitries in the wireless apparatus.

Referring to FIG. 11, the apparatus may comprise a communication controller circuitry 10 configured to control wireless communications in the access node. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including beacon messages, measurement reports, channel reservation messages, MEG frames, etc. The communication controller circuitry 10 may further comprise a data part 16 that handles transmission and reception of payload data when the access node is associated to one or more other wireless apparatuses.

The communication control circuitry 10 may further comprise a MEG processor 14 configured to create the interfering node subsets and the non-interfering node subsets on the basis of the mapping information received from one or more other access nodes through the control part 12. The subsets may be stored in a memory 20 as the MEG groups. Each MEG group may comprise at least one of the interfering node subset and the non-interfering node subset per node of an overlapping wireless network. In this manner, the MEG processor may determine the nodes that are interferers towards nodes of overlapping network(s). According to another aspect, the MEG processor 14 may gather the MEG groups from the point of view of the interfered node by using the measurement reports received from the terminal devices of its network through the control part 12. In this manner, the MEG processor 14 may gather the MEG groups that map one or more interfering node(s) to interfered nodes. The MEG processor 14 may cause the control part to transmit one or more of these MEG groups in the above-described manner to access node(s) of neighbouring wireless networks.

The communication control circuitry 10 may further comprise a contention-free period (CFP) manager 15 configured to carry out channel reservations for nodes of the wireless network of the access node. The CFP manager 15 may employ the MEG group(s) 24, if there is at least one pending reservation and the CFP manager determines that the reservation it is making overlaps with the pending reservation. The CFP manager may then determine the non-interfering node subset(s) for the pending reservation(s) and make the channel reservation exclusively to members of the non-interfering node subset(s). If there are multiple overlapping reservations pending, the CFP manager 15 may employ the MEG group of each overlapping reservation and select a non-interfering node subset that is an intersection of the considered non-interfering node subsets. In other words, the CFP manager may select a subset of nodes of its networks that causes no interference towards either node owning the pending reservations. Upon selecting the parameters and the owner of the reservation, the CFP manager 15 may cause the control part 12 to transmit a channel reservation message. Depending on the embodiment, the MEG processor 14 may cause the control part to transmit the MEG information in connection with the channel reservation message, as described above.

The circuitries 12 to 16 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 16 or all of them.

The apparatus may further comprise the memory 20 that stores computer programs (software) 26 configuring the apparatus to perform the above-described functionalities of the access node. The memory 20 may also store communication parameters and other information needed for the wireless communications, e.g. the MEG groups 24. The apparatus may further comprise radio interface components 22 providing the apparatus with radio communication capabilities within one or more wireless networks. The radio interface components 22 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the access node comprises at least one processor and at least one memory including a computer program code, wherein the at least one memory and the computer program code are configured, with the at least one processor, to cause the apparatus to carry out the functionalities of the access node according to any one of the embodiments of FIGS. 2 to 10. Accordingly, the at least one processor, the memory, and the computer program code form processing means for carrying out embodiments of the present invention in the access node or, in general, a wireless apparatus.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 10 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless systems defined above but also to other suitable wireless communication systems. The protocols used, the specifications of the wireless communication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
acquiring, by an access node of a first wireless network from at least one node of the first wireless network, information on at least one interfering node of a second wireless network;
generating, by the access node, mapping information between the at least one node of the first wireless network and said at least one interfering node;
causing, by the access node, transmission of the mapping information to another access node of the second wireless network, wherein the at least one interfering node and the another access node are different nodes; and
causing transmission of a channel reservation message reserving a channel for the at least one node of the first wireless network, wherein the mapping information is transmitted in connection with the channel reservation message.

2. The method of claim 1, wherein the mapping information is transmitted in a separate frame after the channel reservation message.

3. The method of claim 2, wherein the channel reservation message comprises an information element indicating that the mapping information frame will be transmitted after the channel reservation message.

4. The method of claim 1, wherein the mapping information is transmitted in the channel reservation message.

5. The method of claim 1, wherein the mapping information specifies a time interval when the at least one node of the first wireless network is requested to be protected from interference by the at least one interfering node.

6. The method of claim 1, wherein the channel reservation message is a scheduling message defining a contention-free period for the at least one node of the first wireless network.

7. A method comprising:
acquiring, by a first access node of a first wireless network from a second access node of a second wireless network, mapping information mapping at least one node of the second wireless network with at least one node of the first wireless network, wherein the first access node of the first wireless network and the at least one node of the first wireless network are different nodes;
determining, by the first access node on the basis of the mapping information, at least a first subset and a second subset from nodes of the first wireless network;
acquiring, by the first access node, information on a channel reservation for the at least one node of the second wireless network; and
preventing, by the first access node, transmission by at least one node of the first subset during the channel reservation while allowing transmission by at least one node of the second subset during the channel reservation.

8. The method of claim 7, wherein the channel reservation specifies a contention-free period.

9. The method of claim 8, further comprising in the first access node: establishing a second contention-free period for a subset of nodes of the first wireless network, wherein the second contention-free period overlaps with the contention-free period of the least one node of the second wireless network, and wherein the subset of the nodes of the first wireless network excludes the first subset.

10. An apparatus comprising:
at least one processor; and
at least one memory including a computer program code, wherein the at least one memory and the computer program code are configured, with the at least one processor, to cause the apparatus to:
acquire, as originated from at least one node of a first wireless network, information on at least one interfering node of a second wireless network;
generate mapping information between the at least one node of the first wireless network and said at least one interfering node; and
cause transmission of the mapping information to an access node of the second wireless network, wherein the at least one interfering node and the access node of the second network are different nodes; and
cause transmission of a channel reservation message reserving a channel for the at least one node of the first wireless network, wherein the mapping information is transmitted in connection with the channel reservation message.

11. The apparatus of claim 10, wherein the mapping information is transmitted in a separate frame after the channel reservation message.

12. The apparatus of claim 11, wherein the channel reservation message comprises an information element indicating that the mapping information frame will be transmitted after the channel reservation message.

13. The apparatus of claim 10, wherein the mapping information is transmitted in the channel reservation message.

14. The apparatus of claim 10, wherein the mapping information specifies a time interval when the at least one node of the first wireless network is requested to be protected from interference from the at least one interfering node.

15. The apparatus of claim 10, wherein the channel reservation message is a scheduling message defining a contention-free period for the at least one node of the first wireless network.

16. An apparatus for operating as or within a first access node of a first wireless network, the apparatus comprising:
   at least one processor; and
   at least one memory including a computer program code, wherein the at least one memory and the computer program code are configured, with the at least one processor, to cause the apparatus to:
      acquire mapping information mapping at least one node of a first wireless network with at least one node of a second wireless network, wherein the mapping information is originated from an access node of the second wireless network, wherein the first access node of the first wireless network and the at least one node of the first wireless network are different nodes;
      determine, on the basis of the mapping information, at least a first subset and a second subset from nodes of the first wireless network;
      acquire information on a channel reservation for the at least one node of the second wireless network; and
      prevent transmission by at least one node of the first subset during the channel reservation while allowing transmission by at least one node of the second subset during the channel reservation.

17. The apparatus of claim 16, wherein the channel reservation specifies a contention-free period.

18. The apparatus of claim 17, wherein the at least one memory and the computer program code are configured, with the at least one processor, to cause the apparatus to establish a second contention-free period for a subset of nodes of the first wireless network, wherein the second contention-free period overlaps with the contention-free period of the least one node of the second wireless network, and wherein the subset of the nodes of the first wireless network excludes the first subset.

* * * * *